July 17, 1956     M. W. BULLOCK     2,755,288
3(1,2-DITHIANYL)-ALIPHATIC ACIDS AND THEIR ESTERS
Filed June 13, 1952
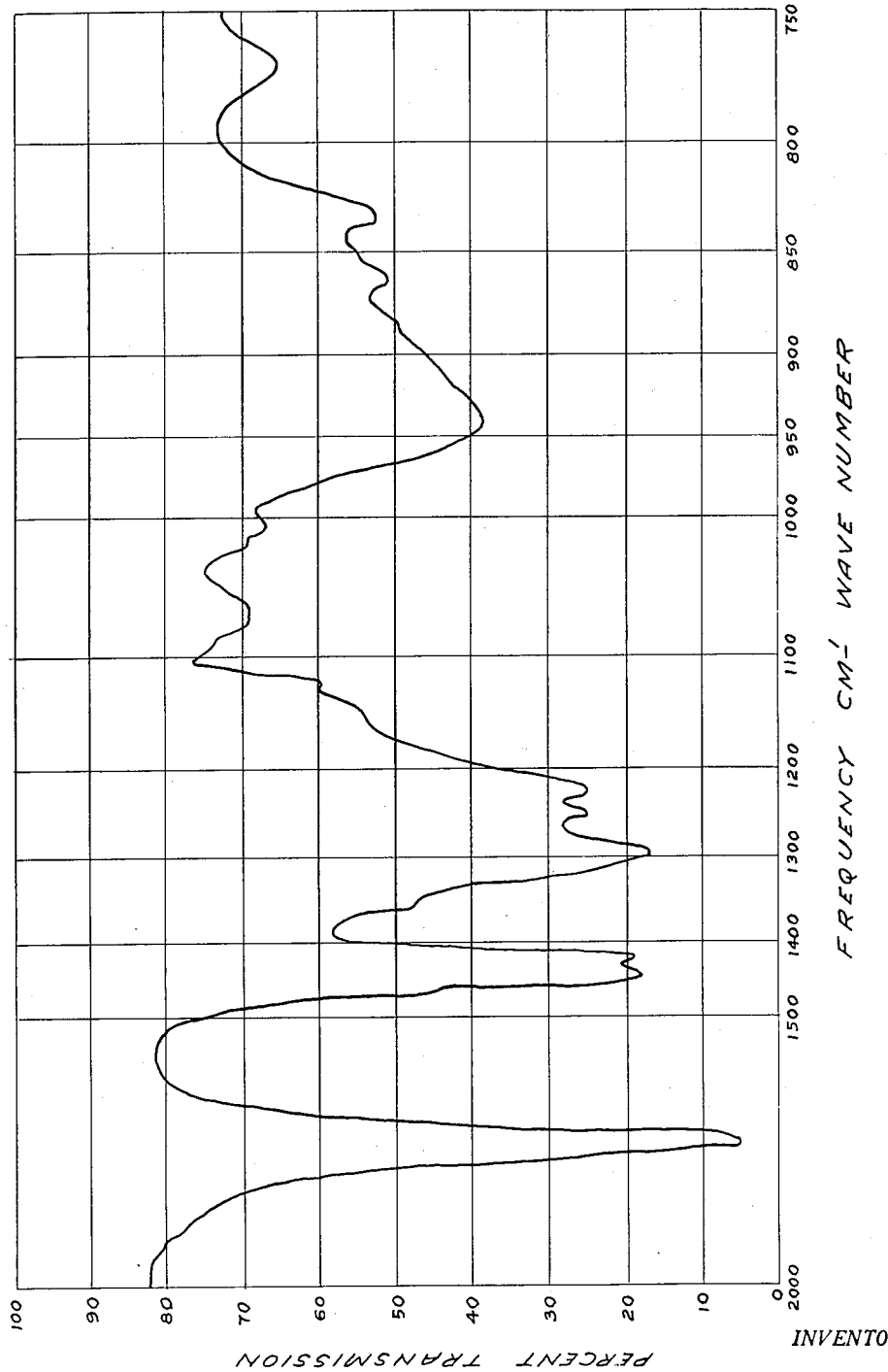
INVENTOR.
BY MILON W. BULLOCK,
ATTORNEY United States Patent Office 2,755,288
Patented July 17, 1956

2,755,288

3(1,2-DITHIANYL)-ALIPHATIC ACIDS AND THEIR ESTERS

Milon W. Bullock, Pearl River, N. Y., assignor to American Cyanamid Company, New York, N. Y., a corporation of Maine Application June 13, 1952, Serial No. 293,304

8 Claims. (Cl. 260—327)

This invention relates to new organic compounds and to processes of preparing the same. The present application is a continuation-in-part of my application, Serial Number 267,280, filed January 19, 1952, now abandoned.

The new compounds of the present invention may be represented by the following formula

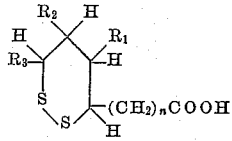

In this formula, the radicals $R_1$, $R_2$ and $R_3$ represent substituents which may be hydrogen, alkyl or aryl radicals and $n$ represents zero or a small whole number. The values of $R_1$, $R_2$, $R_3$ and $n$ may, of course, be different in any particular compound. The salts and esters of these new acids are also included within the scope of the present invention. The new compounds are readily oxidized and may be used as oxidation inhibitors, particularly oils in which they are soluble. Certain of these compounds are also found to be useful in supporting the growth of protozoa and bacteria.

A preferred process of preparing the new compounds employs dithiols having the following structure $$R_3-CH-CH-CH-CH-(CH_2)_nCOOH$$
$$\quad | \quad\;\; | \quad\; | \quad\;\; |$$
$$\;\;SH \;\; R_2 \; R_1 \;\; SH$$

in which the values $n$, $R_1$, $R_2$ and $R_3$ are the same as above. These compounds are also believed to be new. Illustration of the preparation of the new compounds of the present invention from known starting materials will, however, be described in full in examples which follow.

The known starting materials for producing these new products are tetrahydrofuran derivatives of the type

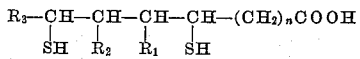

where $R_1$, $R_2$ and $R_3$ are hydrogens, alkyl or aryl groups and $n$ is a small whole number. The compounds described above are preferably treated with a halogen acid such as HBr or a mixture of potassium iodide in phosphoric acid. The reactions involving the halogen acid are preferably carried out by passing the dry gas into the tetrahydrofuran compound when the latter is a liquid. Inert solvents such as xylene, toluene or the like may be used to dilute these liquids when their viscosity is higher than desired or when the tetrahydrofuran is a solid. The principal products of the reaction are substituted acids and lactones of the type

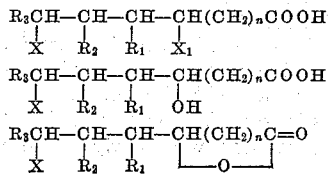

together with small amounts of isomeric products formed by migration of the substituent attached to the secondary carbon atom to either adjacent carbon atom, which are represented by formulas of the type

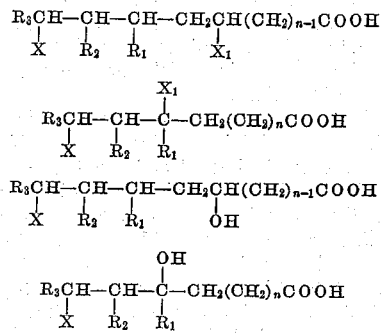

The lactones of the latter are also present. The kind and proportion of these isomers depends on the reagents used and the manner in which the products are isolated from the reaction mixture.

Alternatively, the tetrahydrofuran ring may be opened with acyl halides such as acetylbromide. When acyl halides are used for this purpose, $X_1$ is an acyl radical. These products, or mixture of products, including those prepared by treatment with halogen acids, can be used without purification in further steps of the process or they can be purified by recrystallization from suitable solvents or by distillation at reduced pressures. On distillation the compounds are converted to the lactone form if the value of $n$ is 2, 3 or 4.

Treatment of the above products with thiourea in a suitable inert solvent results in replacement of the halogen atom and the formation of a thiuronium salt of corresponding type, principal of the formula

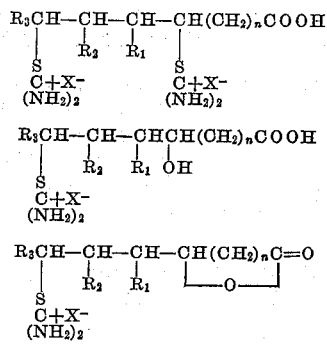

together with small amounts of isomeric salts formed from the rearrangement products illustrated above. The values of $R_1$, $R_2$, $R_3$ and $x$ are the same as before.

The thiuronium salts are very difficult to crystallize or obtain in a pure condition, but fortunately, they need not be purified but can be hydrolyzed directly in the reaction mixture in which they are formed to yield thiol derivatives of the type

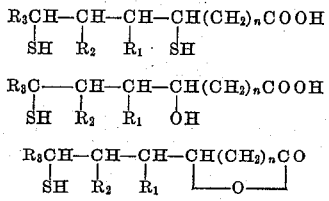

together with small amounts of isomeric compounds of the type discussed above.

When the starting material is principally a dihalogen substituted acid, treatment with thiourea and hydrolysis may be sufficient. When appreciable amounts of the hydroxy acid, the lactone or the acetyl derivatives are present, the conversion of these to the dithiols is accomplished by treating these with thiourea in the presence of halogen acid as is illustrated in Examples 9, 11 and 12 whereby the dithiuronium salt is obtained and then converted to a dithiol by hydrolysis.

These thiols can be purified by distillation at reduced pressure or by recrystallization from suitable solvents for compounds that are solids. The relative amounts of the acid and lactone forms will be dependent on the value of $n$, and the manner in which the product is isolated from the reaction mixture.

To obtain the compounds of the present invention the $(2+n)$, $(5+n)$ dithiol in purified state or, if desired, a mixture of the crude hydrolyzed reaction product containing a $(2+n)$, $(5+n)$ dithiol, is oxidized to an intramolecular disulfide with a suitable oxidizing agent such as air, iodine or preferably a dilute aqueous solution of $I_2$-KI. The oxidation is conveniently carried out by dissolving the dithiol in an inert solvent, such as chloroform, and slowly adding an aqueous solution of KI-$I_2$. The intramolecular disulfide formed by this oxidation may be represented by the formula

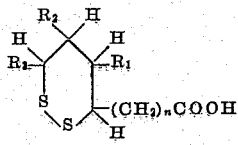

As noted above as a result of the series of reactions involving halogenation, treatment with thiourea, and hydrolysis of the crude product small amounts of $(3+n)$, $(5+n)$ dithiols are also obtained. Oxidation of these products yields compounds having the formula

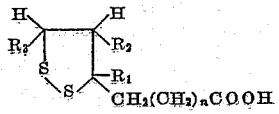

These compounds are new and form the subject matter of my co-pending application Ser. No. 284,205 filed April 24, 1952.

It is also found that small amounts of a product are formed as a result of the series of reactions in which the thiol groups are apart by 5 carbon atoms. On oxidation of these products, which may be termed $(1+n)$, $(5+n)$ dithiols, an intramolecular disulfide is formed corresponding to the following formula

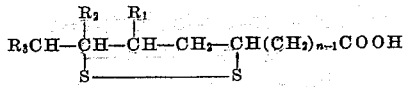

These compounds are also useful as oxidation inhibitors and have some biological activity in supporting the growth of certain microorganisms.

To illustrate the invention with greater particularity, reference is made to the following examples in which representative compounds of the invention are prepared from known materials. It will be understood that the quantities and conditions of these several reactions are given with reference to particular compounds, and the invention is not restricted thereto. All parts are by weight unless otherwise specified.

EXAMPLE 1

A mixture of 5.0 g. of γ-(2-tetrahydrofuryl)-butyric acid, 10.5 g. potassium iodide and 9.0 g. 95% phosphoric acid was stirred mechanically and heated in an oil bath at 140–150° for three hours. The cooled solution was diluted with just enough water to dissolve the solid phase and the product extracted with two 25 ml. portions of ether. The combined ether extracts were dried over sodium sulfate and distilled. This yielded 8.6 g. of a yellow oil, the analysis of which indicated that the compound obtained was a mixture of 5-hydroxy-8-iodocaprylic acid and its lactone.

A sample of the product obtained from another similar run was separated into the neutral lactone and the acid fraction. The ratio of lactone to acid from this run was 3 to 5.1. Distillation of the crude product from the reaction gave only the neutral product 5-hydroxy-8-iodocaprylic acid lactone, B. P. 148–152° at 0.1 mm.

A solution of 35 g. of the crude mixture of 5-hydroxy-8-iodocaprylic acid and its lactone, 20 g. of thiourea and 45 g. of 50% HI was heated at reflux for 16 hours. The cooled solution was made alkaline and heated for a few minutes to hydrolyze the dithiuronium salt. The hydrolyzed solution was acidified and extracted with chloroform to remove the 5,8-dithiolcaprylic acid. The dithiol was not isolated and purified but was oxidized in the chloroform solution to the γ-[3-(1,2-dithianyl)]-butyric acid by titrating the solution with aqueous KI-$I_2$ solution. The excess iodine was destroyed by the addition of a small amount of sodium thiosulfate solution. The chloroform layer was separated and dried over sodium sulfate. Distillation of the chloroform left an oily residue of γ-[3-(1,2-dithianyl)]-butyric acid. The product which distilled at 152° 0.1 mm. pressure had an index refraction of 1.549 using sodium light at 20° C. The product is soluble in methanol, ethanol, chloroform and ether, moderately soluble in cyclohexane, and insoluble in petroleum ether and cold water.

The infra-red adsorption spectrum of γ-[3-(1,2-dithianyl)]-butyric acid is shown in the accompanying drawing which is a draftman's reproduction of part of a curve drawn by a Perkin Elmer double beam recording spectophotometer using a smear of the uncrystallized oil on a rock salt prism. As the oil crystallizes the curve that is obtained shows more distinct absorption bands at, however, the same wave number. The compound just described supports the growth of certain microorganisms such as *Tetrahymena geleii* and *Corynebacterium bovis*. The acid also stimulates the early growth phase of *Streptococcus lactis* and also inhibits the toxic action of propionic acid for *S. faecalis*.

EXAMPLE 2

Esters of the acid described above can be prepared by treatment with alcohol and a strong acid such as anhydrous hydrochloric, sulfuric, benzene sulfonic and others or with diphenyldiazomethane or diazomethane. The methyl ester of the acid is prepared as follows: 220 milligrams of acid in benzene is treated with a benzene solution of diazomethane until a yellow color persisted and vigorous evolution of nitrogen ceased. A small amount of a flocculent precipitate is centrifuged and discarded. The solution is evaporated to dryness, taken up in benzene and chromatographed on silicic acid to yield about 85 milligrams of a light yellow oil.

EXAMPLE 3

*Preparation of γ-[3-(1,2-dithianyl)]-butyric acid*

A solution of 111 g. of 95% phosphoric acid, 50 g. (0.316 mole) of γ-(2-tetrahydrofuryl)-butyric acid and 200 g. of potassium iodide was stirred rapidly and heated 125–140° for three hours. The solution was cooled and diluted with enough water to dissolve the salts. The product was recovered by extraction of the solution with chloroform. Distillation of the solvent left 102 g. of crude product.

This crude material was mixed with 200 ml. of 50% HI and 120 g. of thiourea and refluxed eight hours. The resulting reaction mixture was made alkaline with concentrated KOH solution and refluxed an additional thirty minutes to hydrolyze the intermediate isothiuronium salts. The aqueous solution was now acidified and the crude dithiol acid extracted with chloroform. The chloroform solution was stirred rapidly while a sufficient quantity of aqueous KI-$I_2$ solution was slowly added to impart a brown color to the chloroform solution. The excess iodine was destroyed by washing the chloroform solution with dilute sodium thiosulfate. The chloroform solution of the intramolecular disulfide was dried over sodium sulfate and distilled leaving 74 g. of a yellow oil. The oil was purified by vacuum distillation. The major portion of the oil distilled 160° at 0.1 mm. This oil crystallized to sticky crystals on standing. Recrystallization of the product from cyclohexane gave 14.3 grams of white crystals, M. P. 58°. The analysis checked very closely for the theoretical $C_8H_{14}S_2O_2$.

This compound γ-[3-(1,2-dithianyl)]-butyric acid has a pronounced stimulatory effect on the growth of *Streptococcus faecalis*, as it does for some other microorganisms. The concentration of this material necessary for half-maximal growth for the organism *Tetrahymena geleii* is 0.098 gamma per ml. The concentration necessary for half-maximal growth for the microorganism *Corynebacterium bovis* is 0.61 gamma per ml. of culture medium.

EXAMPLE 4

35 gm. of 5 methyl furyl acrylic acid was dissolved in 225 ml. of denatured alcohol. 2 gms. Raney nickel was added and hydrogenated at 150° C. and 3,000 lbs. pressure until 3 mols of hydrogen had been absorbed. The solution was then cooled, and the catalyst filtered off, and the solvent distilled off. The product distilled at 5 mm. pressure.

A mixture of 22 gms. of crude 5 methyl tetrahydro furyl propionic acid was prepared as described above. 92 gms. KI, 80 gms. of 95% phosphoric acid was heated with stirring at 140–150° for 3 hours. The crude solution was diluted with water to dissolve the salt, and the product extracted with ether. The ether was dried over sodium sulfate, and the product distilled to leave a black residue.

The crude product obtained from the above reaction was heated at reflux with 22 gms. of thiourea and 50 gms. of 50% HI for 18 hours. On cooling, silky needles separated from solution which were filtered off, and discarded. The filtrate was made alkaline with 20% NaOH to pH 13 and heated at 100° for 30 minutes. The solution was acidified with concentrated HCl and the oil product recovered by two 75 ml. portions of $CHCl_3$. The combined $CHCl_3$ extracts were dried over sodium sulfate and distilled. The residue was vacuum distilled to obtain 4–7 dithiolcaprylic acid as its lactone. This was oxidized to the cyclic disulfide with $KI-I_2$ solution in the same manner as described in Example 1.

EXAMPLE 5

Dry hydrogen bromide was passed into 100 g. (0.631 mole) of γ-(2-tetrahydrofuryl)-butyric acid at 100° C. until no more HBr was taken up by the solution. The excess hydrogen bromide was removed by heating the compound on the steam bath under the reduced pressure of a water aspirator, and the product purified by distilling twice under reduced pressure. The lactone distilled at 139° C. at 0.1 mm. and has an index refraction of 1.5001 at 20° C. (Abbe refractometer).

The infra-red spectrum of the product obtained from this reaction shows that a part of the material has rearranged to the lactone so that the product is a mixture of 8-bromo-5-hydroxycaprylic acid lactone and 8-bromo-4-hydroxycaprylic acid lactone.

EXAMPLE 6

One hundred grams (0.63 mole) of γ-(2-tetrahydrofuryl)-butyric acid was placed in a 250 ml. round bottom flask equipped with a reflux condenser and 117 g. (0.955 mole) of acetylbromide was poured slowly down the condenser. The solution became dark and refluxed from the heat of the reaction. After the spontaneous reflux subsided, the reaction mixture was heated at reflux two hours. The cooled reaction mixture was poured over 400 g. of crushed ice and the product, principally 8-bromo-5-acetylcaprylic acid, recovered by extraction of the solution with two 200 ml. portions of chloroform. The combined chloroform extracts were dried over sodium sulfate and distilled. The residue was purified by vacuum distillation. The product distilled at 141–156° C. at 0.1 to 0.5 mm. and weighed 105 g. (0.48 mole), 75%. A purified sample had $N_D^{20}$ 1.5001 and a saponification equivalent of 111.6. These physical constants indicate that the compound is identical with the product obtained by HBr cleavage described above indicating the loss of the 5-acetyl group on distillation. The compound when prepared in this manner is difficult to obtain pure, presumably due to a small amount of 8-acetyl-4-hydroxycaprylic acid lactone formed along with the principal product.

EXAMPLE 7

A mixture of 57 g. (0.36 mole) of γ-(2-tetrahydrofuryl)-propionic acid, 115 g. of 85% phosphoric acid, 28.5 g. of phosphorus pentoxide and 162 g. of potassium iodide was heated at 125° C. in an oil bath and stirred rapidly for three hours. The cooled solution was diluted with enough water to dissolve the salts and the product recovered by extraction with ether. The ether extracts were dried over sodium sulfate and distilled. The residue was distilled in vacuo to yield 40.5 g. of product distilling 142–146° C. at 1 mm. The product darkens rapidly on standing.

*Anal.*—Calcd. for $C_7H_{11}O_2I$: C, 33.2; H, 4.36; I, 50.0. Found: C, 33.69; H, 4.57; I, 50.18.

EXAMPLE 8

A solution of 25 g. (0.113 mole) of 8-bromo-4 and 5-hydroxycaprylic acid lactones, 8.6 g. (0.113) of thiourea and 50 ml. of methanol were heated at reflux for three hours. The intermediate thiuronium salt did not crystallize from the solution, and distillation of the solvent left an oil. This salt was hydrolyzed by refluxing one hour with 15 g. of KOH in 150 ml. of water. The cooled alkaline solution was extracted with 50 ml. of chloroform to remove a small amount of insoluble oil. The water solution was acidified with concentrated HCl and the precipitated oil extracted with two 40 ml. portions of chloroform. The combined chloroform extracts were dried over sodium sulfate and distilled. The fraction distilling 116–122° C. at 0.15 mm. was collected. The physical constants of the product are: B. P. 121–122° C. at 0.15 mm., $N_D^{20}$ 1.5100, and $$d\frac{20}{20}1.116$$

*Anal.*—Calcd. for $C_8H_{14}O_2S$: C, 55.2; H, 8.05; S, 18.35; saponification equivalent, 174; $Mr_D$ 46.2. Found: C, 54.86; H, 8.1; S, 18.22; saponification equivalent, 172; $Mr_D$ 46.6.

Infra-red studies on this compound show that it is a mixture of 8-mercapto-4 and 5-hydroxycaprylic acid lactones.

EXAMPLE 9

A mixture of 37.7 g. (0.147 mole) of 7-iodo-4-hydroxyheptanoic acid lactone, 26 g. (0.34 mole) thiourea and 42 g. of 48% HBr was heated at reflux for sixteen hours. The cooled solution was made alkaline to pH 13 and refluxed ½ hour. The alkaline solution was acidified with 10% HCl and the dithiol recovered by extraction of the solution with chloroform. The chloroform extract was dried over sodium sulfate and distilled. The product distilled 134–139° C. at 0.3 mm. and weighed 18.8 g. (0.107 mole), 73%. The index of refraction of this material is 1.5454 at 20° C. A saponification equivalent value of 172 was observed as compared to the theoretical value of 176 for 4,7-dithiolheptanoic acid lactone.

EXAMPLE 10

A solution of 95% phosphoric acid was made by dissolving 11 g. of phosphorous pentoxide in 100 g. of 85% phosphoric acid. The solution was cooled and 50 g. (0.316 mole) of γ-(2-tetrahydrofuryl)-butyric acid and 200 g. of potassium iodide was added. The resulting mixture was stirred rapidly and heated 125-140° C. for three hours. The solution was diluted with enough water to dissolve the salts present and the product extracted with two 100 ml. portions of ether. The combined ether was washed with dilute sodium thiosulfate solution and dried over sodium sulfate. Distillation of the ether left 85.5 g. of a yellow oil. This oil is principally a mixture of 8-iodo-5-hydroxycaprylic acid and its lactone. Some 5,8-diiodocaprylic acid is also present in the mixture.

Distillation of an aliquot of this material gave the 8-iodo-5-hydroxycaprylic acid lactone, distillation 148–150° C., $N_D^{24}$ 1.5496.

EXAMPLE 11

A solution of 22 g. 7-iodo-4-hydroxycaprylic acid and its lactone, prepared by treating 22 g. of 2-(5-methyltetrahydrofuryl)-propionic acid with potassium iodide in 95% phosphoric acid, 22 g. of thiourea and 50 g. of 50% HI was heated at reflux 18 hours. The resulting solution was alkalinized with 20% sodium hydroxide and heated on the steam bath ½ hour to hydrolyze the intermediate thiuronium salt. The alkaline solution was acidified and the product recovered by extraction of the solution with chloroform. The chloroform extract was dried over sodium sulfate and distilled. The residue was distilled 108–153° C. at 5 mm. and weighed 20 g. The physical constants of the purified material are: B. P. 153° C. at 5 mm., $N_D^{20}$ 1.5131. A saponification equivalent of 172 was observed for the 4,7-dithiolcaprylic acid lactone.

EXAMPLE 12

A solution of 4.7 g. of a mixture of 8-bromo-4 and 5-hydroxycaprylic acid lactones, 9 g. of thiourea and 11 g. of 48% HBr were heated at reflux 15 hours. The resulting solution was alkanlinized to pH 13 with sodium hydroxide and refluxed one hour. The resulting solution was acidified with 10% HCl and the product recovered by chloroform extraction. Distillation of the dried chloroform extracts left 3.4 g. of a yellow oil which distilled 142–152° C. at 1 mm. The material has $N_D^{23}$ 1.53. This mixture of thiolactones, especially the delta lactone, are hydrolyzed to the acid by water.

The dithiols prepared as described in the above examples 4,7 dithiol caprylic acid, 5,8 dithiol caprylic acid, 4,7 heptanoic acid as well as various other dithiol aliphatic acids in which the thiols are spaced apart by 4 carbon atoms such as 2,5 dithiol valeric acid, 2,5 dithiol caproic acid, 3,6 dithiol caproic acid, 7,10 dithiol capric acid, 7,10 dithiol lauric acid, 9,12 dithiol lauric acid and the like may be oxidized as described hereinabove to obtain the six membered tetrahydro 1,2-dithianyl compounds of the present invention. Obviously, the thio lactone form of these dithiol aliphatic acids may be employed with equal facility in the reaction to obtain compounds of the present invention in which n is zero or a small whole number and R3 is hydrogen or a short chain alkyl radical. When using dithiol aliphatic acids or their lactones as starting materials which have branched chains, the compounds obtained have alkyl substituents at R1 or R2 as the case may be. As previously noted, the oxidizing agent may be air or other mild oxidizing agents such as iodine or the like. When using these, the resulting dithianyls are unoxidized so that the value of $O_n$ is zero. When using stronger oxidizing agents, one or two atoms of oxygen may be added to the ring so that the value of $n$ is 1 or 2 as the case may be. Control of the degree of oxidation may be exercised by simply adding to the reaction mixture the desired stoichiometric quantity of oxidizing agent and conducting the reaction until the desired quantity of oxygen is taken up by the dithianyl. Suitable oxidizing agents include potassium ferricyanide, benzonoquinone, sodium dichromate, ferric chloride, potassium bromate, sodium hypoiodite, chlorine or other convenient oxidizing agents in suitable solvent media. Inasmuch as the use of these oxidizing agents is within the skill of the art, further elaboration of the details of their use need not be given.

What I claim is:

1. Compounds of the group consisting of those having the formula:

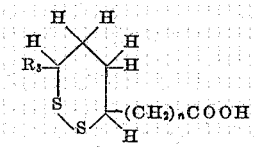

in which R3 is a substituent radical of the group consisting of hydrogen and lower alkyl radicals, and n is a member of the group consisting of zero and small whole numbers and lower alkyl esters of said compounds.

2. The compound gamma-[3-(1,2-dithianyl)]-butyric acid.

3. The methyl ester of gamma-[3-(1,2-dithianyl)]-butyric acid.

4. The compound beta - [3 - (1,2 - dithianyl)]-propionic acid.

5. The compound beta - [6 - methyl - 3 - (1,2 - dithianyl)] - propionic acid.

6. A method of preparing [3 - (1,2 - dithianyl)]-aliphatic acids which comprises the step of reacting a dithiol having the general formula:

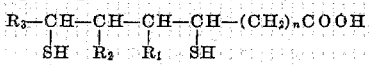

in which R1, R2 and R3 are members of the group consisting of hydrogen and lower alkyl radicals and n is a member of the group consisting of zero and small whole numbers with an oxidizing agent of the group consisting of oxygen, iodine, and iodine-potassium iodide and recovering said compound therefrom.

7. A method of preparing compounds of the group consisting of those having the general formula:

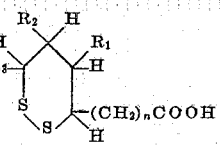

in which R1, R2 and R3 are members of the group consisting of hydrogen and lower alkyl radicals, and n is a member of the group consisting of zero and small whole numbers, which comprises the step of reacting a compound having the following formula:

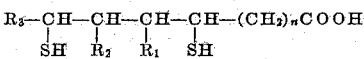

with an oxidizing agent of the group consisting of oxygen, iodine, and iodine-potassium iodide and recovering said compound therefrom.

8. A method of preparing gamma-[3-(1,2-dithianyl)]-butyric acid which comprises the step of reacting 5,8-dithioloctanoic acid with a mild oxidizing agent of the group consisting of oxygen, iodine, and iodine-potassium iodide and recovering said compound therefrom.

References Cited in the file of this patent

UNITED STATES PATENTS

| | | |
|---|---|---|
| 2,539,428 | Jansen | Jan. 30, 1951 |
| 2,559,626 | Jansen | July 10, 1951 |

OTHER REFERENCES

Jansen: "J. Biol. Chem." 176, pp. 657–64 (1948).
Chivers et al.: "Chem. Soc. J." (1928), pp 697–702.
Bullock et al.: J. Am. Chem. Soc. 74, 1868–69 (1952).
Brockman, Jr., et al.: J. Am. Chem. Soc. 74, 1868 (1952).